United States Patent
Haglund et al.

(10) Patent No.: US 7,455,319 B2
(45) Date of Patent: Nov. 25, 2008

(54) TILTING MECHANISM

(75) Inventors: Lennart Haglund, Vårgårda (SE); Kalle Ekdahl, Alingsås (SE); Hans Erlandsson, Alingsås (SE)

(73) Assignee: Autoliv Development AB, Vargarda (SE)

( * ) Notice: Subject to any disclaimer, the term of this patent is extended or adjusted under 35 U.S.C. 154(b) by 146 days.

(21) Appl. No.: 10/571,859

(22) PCT Filed: Sep. 15, 2004

(86) PCT No.: PCT/SE2004/001323

§ 371 (c)(1),
(2), (4) Date: Mar. 14, 2006

(87) PCT Pub. No.: WO2005/030558

PCT Pub. Date: Apr. 7, 2005

(65) Prior Publication Data

US 2007/0029771 A1    Feb. 8, 2007

(30) Foreign Application Priority Data

Sep. 29, 2003    (GB) ................. 0322771.7

(51) Int. Cl.
    *B62D 1/18*    (2006.01)
(52) U.S. Cl. ........................ 280/775; 74/493
(58) Field of Classification Search .............. 280/775, 280/777; 74/493
    See application file for complete search history.

(56) References Cited

U.S. PATENT DOCUMENTS 2,865,222 A * 12/1958 Bachman .................... 74/493
3,504,569 A * 4/1970 Zoltok ........................ 74/493
3,691,866 A * 9/1972 Berkes ........................ 74/493
4,365,825 A    12/1982 Merkle
4,449,419 A * 5/1984 Soler Bruguera ............ 74/493
5,363,716 A * 11/1994 Budzik et al. ................ 74/493
5,507,521 A    4/1996 Steffens, Jr.
5,871,233 A    2/1999 Tanaka et al.
6,685,224 B2 * 2/2004 Pardonnet .................... 280/775

FOREIGN PATENT DOCUMENTS

DE    41 05 821 A1    8/1992
EP    1 057 712 A2    12/2000

OTHER PUBLICATIONS http://en.wikipedia.org/w/index.php?title= Gas_spring &oldid=191824824, Gas Spring, 1 page.
http://www.internationalgassprings.com/html/locking_gs.htm, Locking Gas Springs, 2 pages.
http://www.globalspec.com/FeaturedProducts/Detail/IndustrialGas-Springs/Locking_Gas_Springs/7814/0-31k, Locking Gas Springs, 3 pages.

* cited by examiner

*Primary Examiner*—Kevin Hurley
*Assistant Examiner*—Robert A. Coker
(74) *Attorney, Agent, or Firm*—Harness, Dickey & Pierce, P.L.C.

(57) ABSTRACT

A tilting arrangement for a vehicle steering wheel unit is disclosed. The tilting arrangement incorporates a mount (2) to mount the tilting arrangement on the vehicle. A support element (11) is provided, and the steering wheel unit is pivotally connected (13) to the support element (11) to effect tilting pivotal movement about a pivot axis (13). The support element (11) is moveable relative to the mount (2) so as to move the pivotal axis (13) with a movement which has a substantial upward component.

17 Claims, 6 Drawing Sheets

Figure 1:
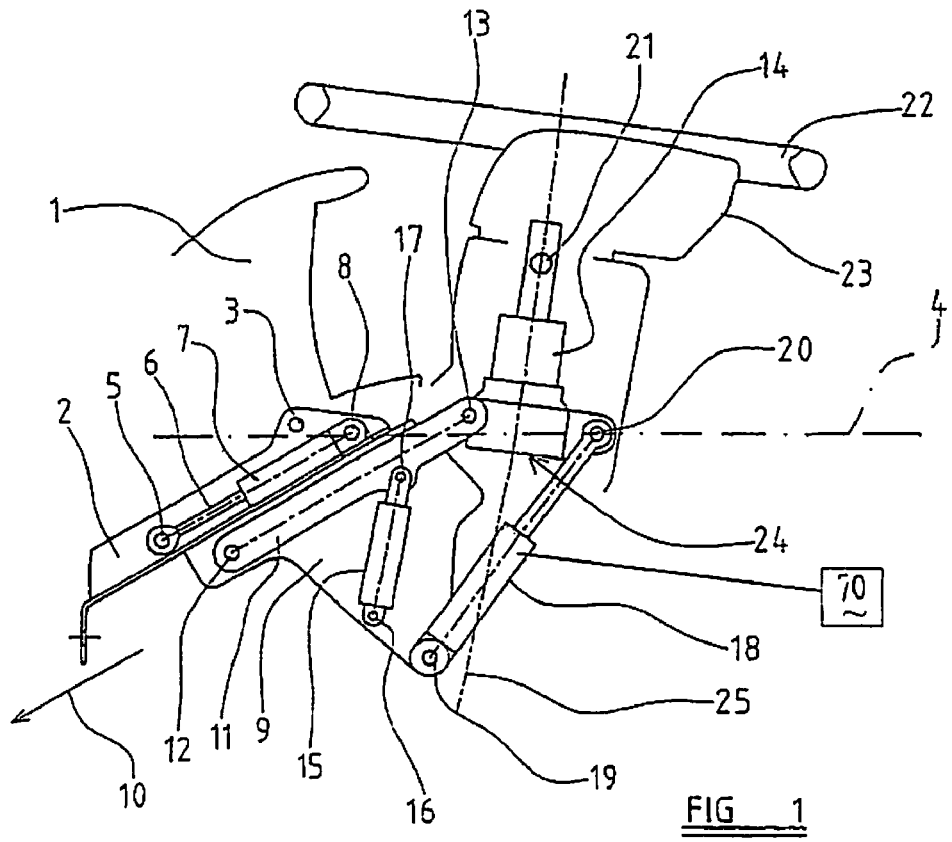

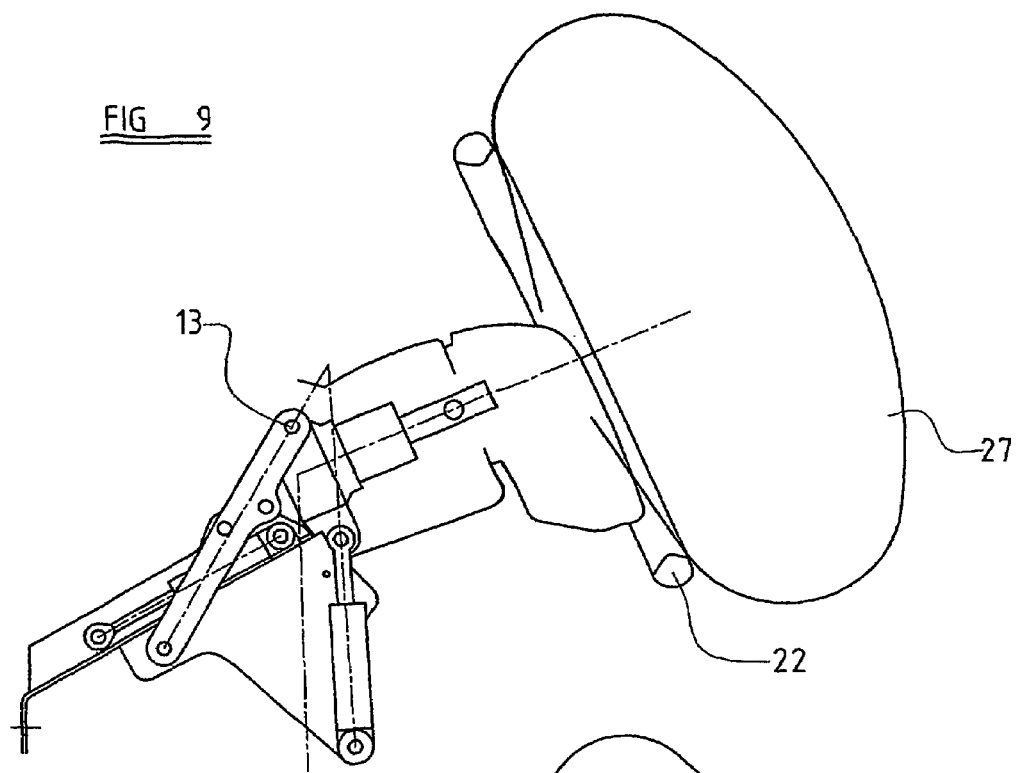
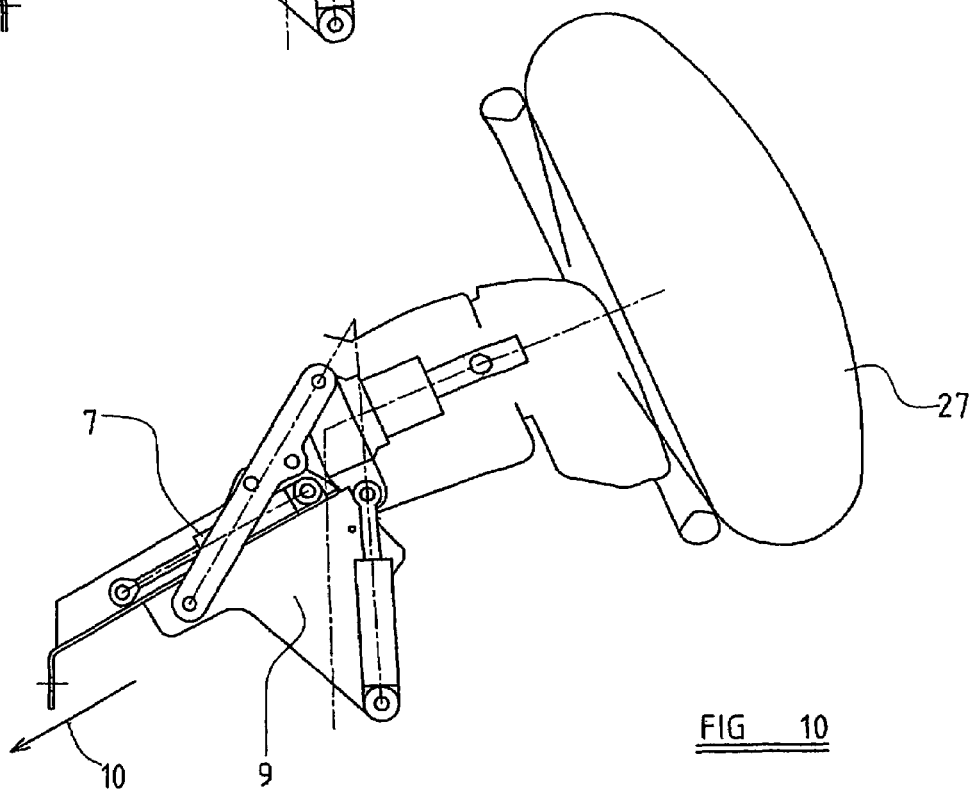

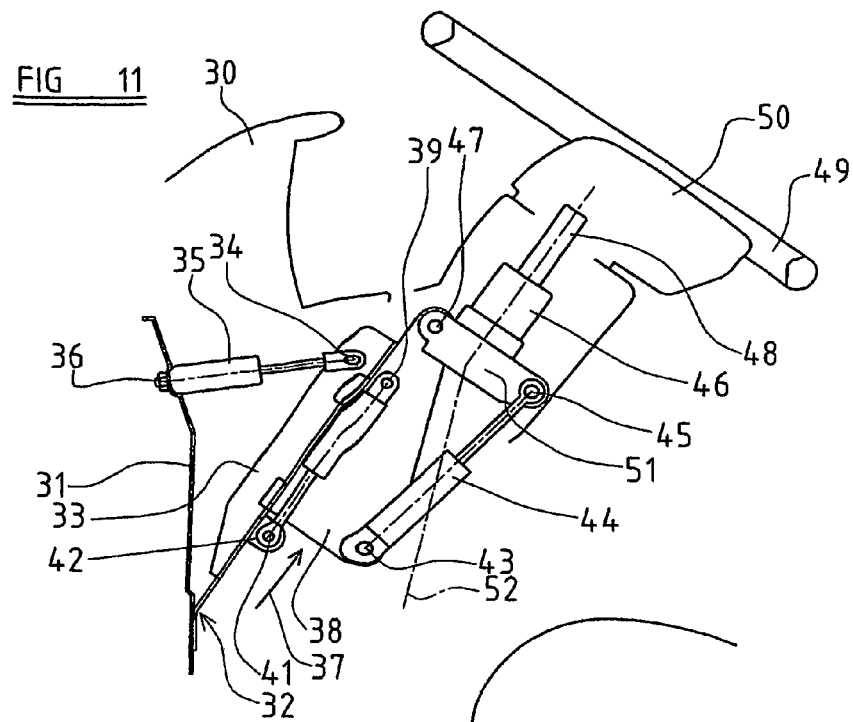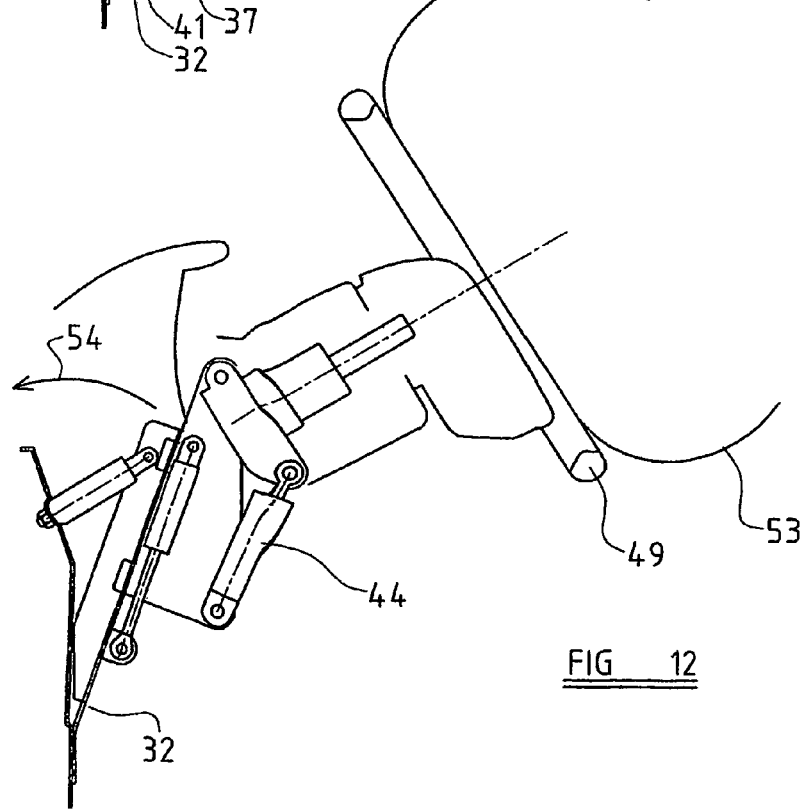

TILTING MECHANISM

THE PRESENT INVENTION relates to a tilting mechanism and more particularly relates to a tilting mechanism for a motor vehicle steering wheel. More particularly the invention relates to a tilting mechanism for a motor vehicle steering wheel which incorporates an inflatable air-bag.

It has been proposed before to provide a tilting mechanism for a motor vehicle steering wheel, especially a motor vehicle steering wheel provided with an inflatable air-bag. Frequently the tilting mechanism is provided to enable the driver of the vehicle to position the steering wheel in an appropriate position, from the point of view of the comfort of the driver. However, it has been found desirable, in many cases, to arrange for the steering wheel to be tilted towards the driver of the vehicle in the event that an accident should occur, to ensure that the air-bag is correctly positioned, when inflated, to provide a maximum degree of protection for the driver of the vehicle.

U.S. Pat. No. 5,507,521 A shows a tilting mechanism of this type, in which the steering wheel is mounted in position in such a way that the steering wheel can effect a pivotal movement about a pivot axis. An actuator is provided which pivots the upper part of the steering column, thus also pivoting the steering wheel, in response to a vehicle condition indicative of a vehicle collision. The steering wheel is thus pivoted towards the driver of the vehicle so the air-bag mounted within the steering wheel is appropriately positioned.

U.S. Pat. No. 5,871,233 A shows an alternative arrangement in which the upper-most part of the steering column, together with the steering wheel mounted thereon, can effect a pivotal motion, in response to sudden deceleration of the vehicle.

In the prior proposed arrangements, as a consequence of the movement of the steering wheel, the lower-most part of the steering wheel rim tends to move downwardly, from its position immediately before the accident or the sudden deceleration of the vehicle, and consequently if the rim of the steering wheel is very close to the legs of the driver before the accident situation arises, the steering wheel may move to a position in which the legs of the driver become trapped.

The present invention seeks to provide an improved tilting mechanism.

According to the present invention, there is provided a tilting arrangement for a vehicle steering wheel unit, the tilting arrangement incorporating a mount to mount the tilting arrangement on the vehicle, a support element, the steering wheel unit being pivotally connected to the support element to effect a tilting pivotal movement, about a pivot axis, the support element being movable relative to the mount so as to move the pivot axis with a movement which has a substantial upward component.

Preferably, the pivotal connection between the support element and the steering wheel unit is towards the rear of the steering wheel unit, there being a further member pivotally connected to the steering wheel unit towards the front of the steering wheel unit so that, as the pivotal connection between the support element and the steering wheel unit effects said movement with a substantial upward component, the steering wheel tilts forwardly.

Advantageously: when the pivotal connection between the steering wheel unit and the support plate has effected said upward movement and the steering wheel has tilted, the rim of the steering wheel, at its lowest point, is not substantially lower than the rim of the steering wheel, at its lowest point before said movement commenced.

Conveniently: when the pivotal connection between the steering wheel unit and the support plate has effected said upward movement and the steering wheel has tilted, the rim of the steering wheel, at its lowest point, is not lower than the rim of the steering wheel, at its lowest point before said movement commenced.

Preferably, the said further element is an element of selectively adjustable length, to enable the degree of tilt of the steering wheel to be selected by a vehicle driver.

Advantageously, the element of selectively adjustable length is a lockable gas spring.

Conveniently, the lockable gas spring is adapted to adopt a condition of minimal length upon receipt of a signal from a sensor.

Preferably, the support element comprises a pivotally mounted support arm, the support arm being pivotally mounted to a support plate at its lower end and being pivotally connected to the steering wheel unit at its upper end, movement of the arm causing the axis of the pivotal connection between the arm and the steering wheel unit to follow an actuate path.

Advantageously, means are provided to retain the arm in an initial position, and to release the arm in an accident situation.

Conveniently, the said retaining means comprise a frangible pin.

Preferably, the retaining means comprise a retractable pin, retractable in response to a signal from a sensor.

Advantageously, a drive unit is provided to drive said support arm to effect said pivotal movement.

Conveniently, the drive unit is a pyrotechnic unit.

Preferably, the support plate is mounted to effect a sliding movement relative to the mount, an energy-absorber being provided to absorb energy as the support plate effects the sliding movement relative to the mount.

Advantageously, the energy-absorbing unit is a lockable energy-absorbing unit, the lockable energy-absorbing unit being configured to be unlocked in response to a signal from a sensor.

Conveniently, the support element is a support plate, the steering wheel unit being pivotally connected to the plate, the said further member being pivotally connected to the support plate and being pivotally connected to the steering wheel unit.

Preferably, the support plate is slidably mounted relative to the mount, and an energy-absorber is provided connected to the support plate and to the mount to absorb energy as the support plate moves relative to the mount. Advantageously, the mount is provided with a hinge to engage part of the chassis of a motor vehicle and is provided with an energy-absorber to absorb energy if the mount executes a hinging movement about the hinge.

Conveniently, the energy-absorber is a lockable energy-absorber, the lock being releasable in response to a signal from a sensor.

Figure 2:
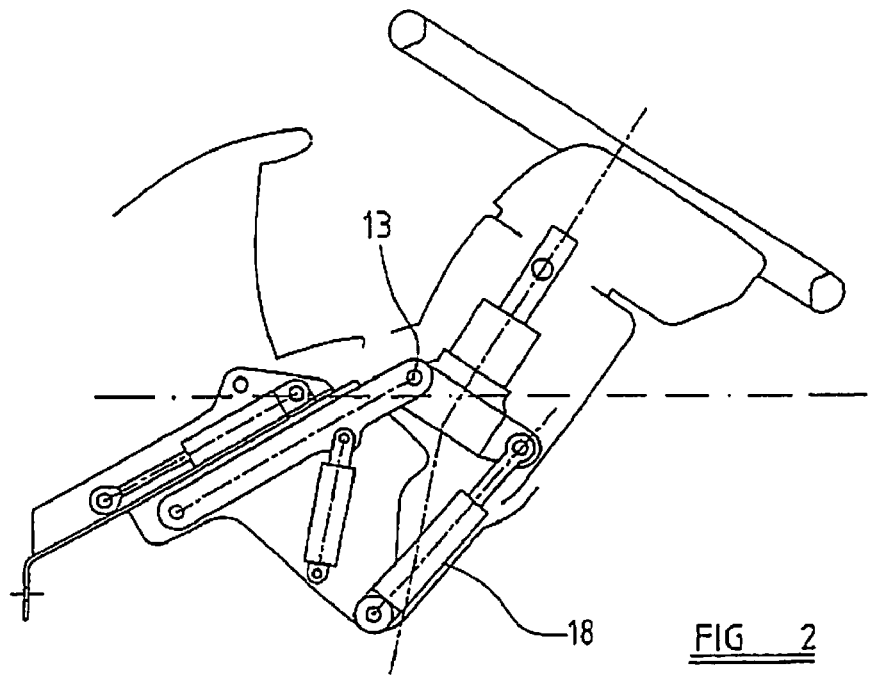
Figure 3:
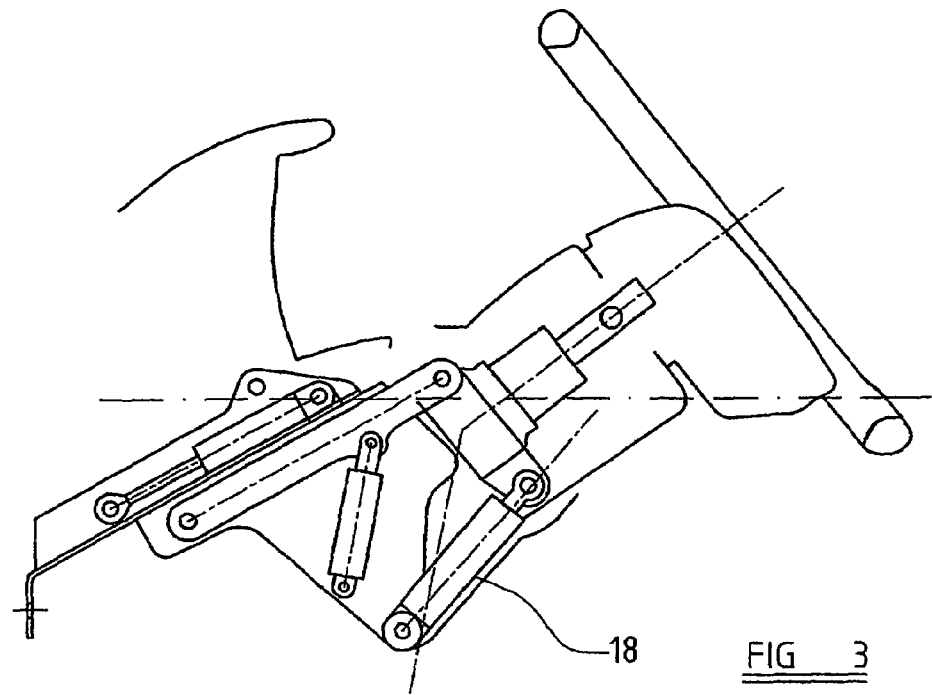
Figure 4:
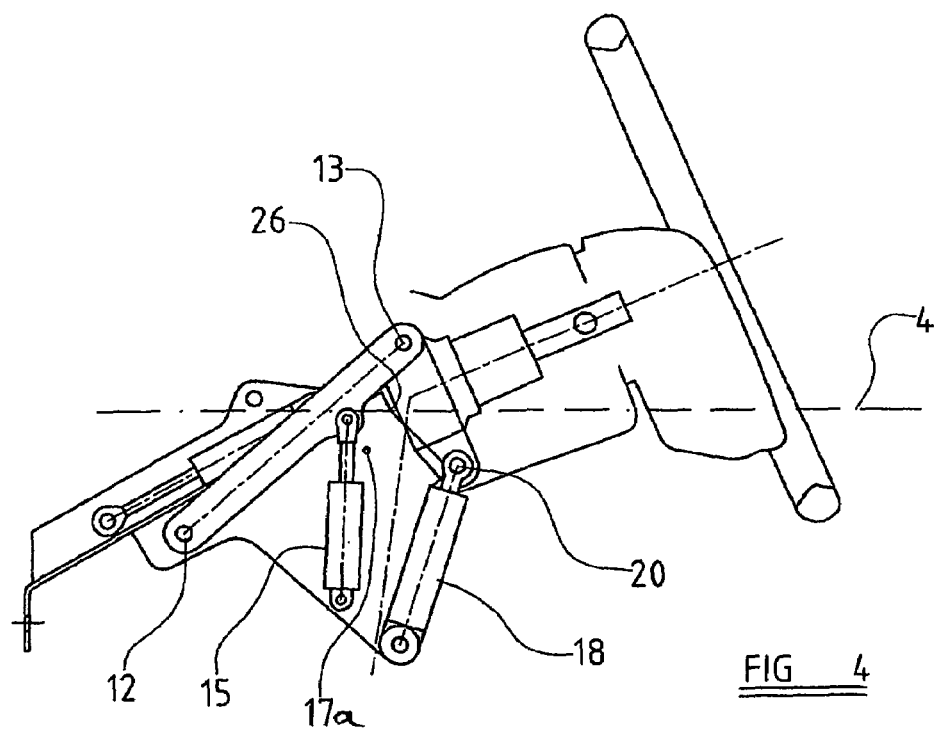
Figure 5:
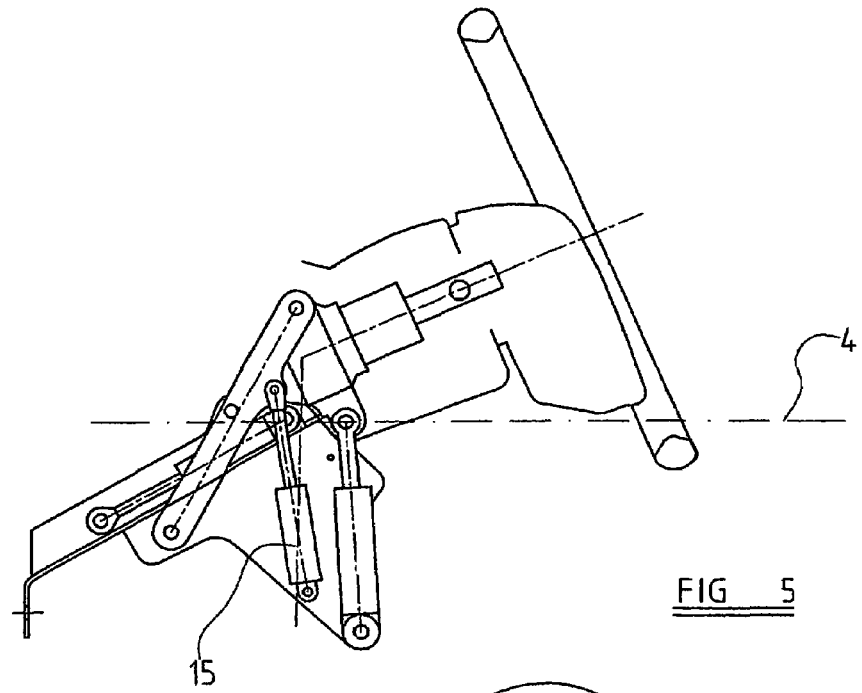
Figure 6:
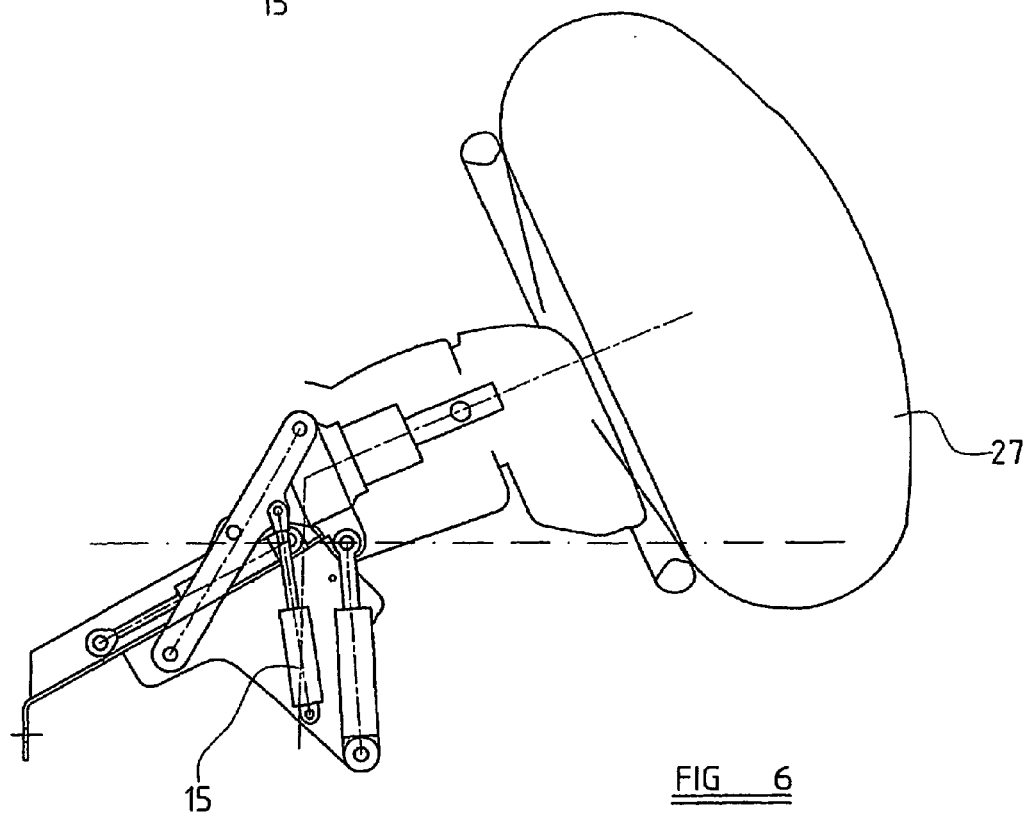
Figure 7:
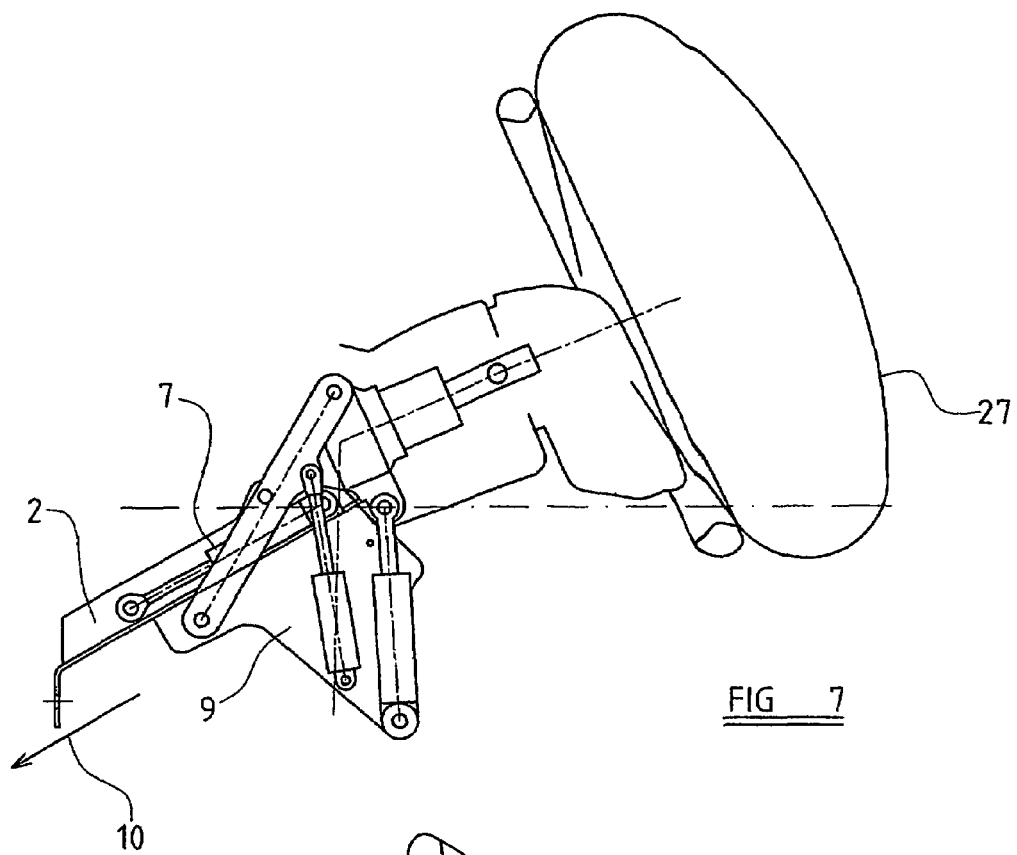
Figure 8:
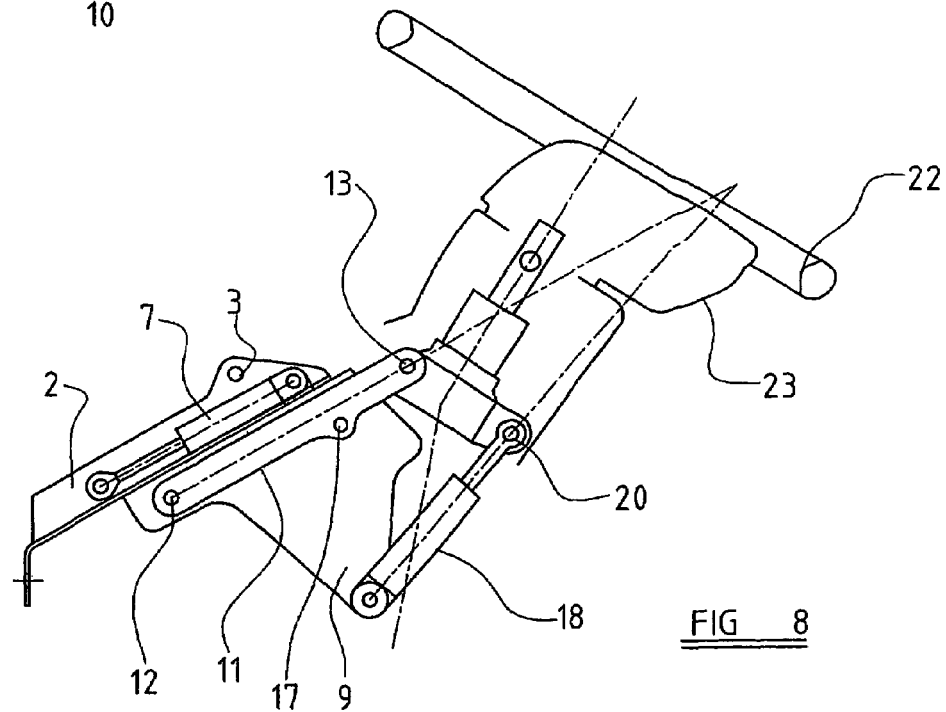

In order that the invention may be more readily understood, and so that further features thereof may be appreciated, embodiments of the invention will now be described, by way of example, with reference to the accompanying drawings in which:

FIG. 1 is a diagrammatic view of a steering wheel provided with a tilting mechanism in accordance with the invention in a first condition, FIG. 2 is a view corresponding to FIG. 1 showing the steering wheel in a second condition, FIG. 3 is a view corresponding to FIG. 2 showing the steering wheel in a third condition, FIG. 4 is a view corresponding to FIG. 2 illustrating the tilt mechanism shortly after an accident situation has been detected, FIG. 5 is a view illustrating the mechanism a few moments later than in FIG. 4, FIG. 6 is a view illustrating the mechanism a few moments later than in FIG. 5, FIG. 7 is a view illustrating the mechanism a few moments later than in FIG. 6, FIG. 8 is a view corresponding to FIG. 1 illustrating an alternative embodiment of the invention, FIG. 9 is a view of the mechanism of FIG. 8 after an accident situation has been detected, FIG. 10 is a view corresponding to FIG. 9 showing the mechanism a few moments later, FIG. 11 is a view, corresponding to FIG. 1, of a further embodiment of a mechanism, and FIG. 12 is a view corresponding to FIG. 11 showing the mechanism after an accident situation has been detected.

Referring to FIG. 1, a motor vehicle 1 is provided with a mounting plate 2 which is securely fastened to the chassis of the vehicle by means of a bolt 3. Other fastenings are used to secure the mounting plate 2 in position, but only the bolt 3 is illustrated. A notional horizontal line 4 is shown in FIG. 1, the line passing through the bolt 3. The reference line 4 is provided purely to facilitate an understanding of the operation of the tilting mechanism that is to be described below.

The mounting plate 2 is provided with a projecting stud 5 which is connected to a rod 6 which extends to the interior of a lockable load absorber 7. The lockable load absorber 7 is connected, by means of a connection 8, to a sliceable support plate 9. The support plate 9 is mounted in position so as to be sliceable relative to the mounting plate 2, in a direction as indicated by the arrow 10.

Initially the load absorber 7 is locked, preventing sliding movement of the support plate 9.

An elongate support arm 11 is provided, a lower end of the support arm 11 being pivotally connected, by means of a pivot 12, to the support plate 9. An upper end of the support arm 11 is pivotally connected by means of a pivotal connection 13, to a boss 14.

A drive element 15, in the form of a pyrotechnic unit is provided, one end of the drive element 15 being pivotally connected by means of a pivot 16 to the support plate 9, and the other end of the drive element 15 being connected by means of a pivot 17 to a point intermediate the two ends of the elongate support arm 11. The drive unit 15 is positioned so that, on actuation thereof, the support arm 11 will effect a pivotal movement about the lower pivot 12, thus moving the upper pivot 13 along an actuate path in a generally upward direction.

A shear pin 17A (concealed in FIGS. 1 to 3, but visible in FIGS. 4 to 7) engages part of the elongate support arm 11 and engages part of the support plate 9 so as initially to retain the support arm 11 in a predetermined position relative to the support plate 9. The shear pin 17a may be replaced by a retractable pin, as will become clear from the following description.

A lockable gas spring 18 is provided, the lockable gas spring 18 being pivotally connected, at its lower end, by means of a pivot 19, to part of the support plate 9. The lockable gas spring is an element of selectively adjustable length. The upper-most end of the gas spring 18 is pivotally connected, by means of a pivot 20, to the boss 14.

The boss 14 receives the upper-most part 21 of a steering column, and mounted on the upper-most part of the steering column is a steering wheel 22. Contained within the steering wheel 22 is a housing 23 which contains an air-bag. The boss 14, together with the part 21 of the steering column, the steering wheel 22 and an air-bag housing 23 form a steering wheel unit, which can be tilted.

The upper-most part 21 of the steering column is connected, by means of a universal joint, provided in the region indicated by the arrow 24, to an intermediate or lower part of the steering column 25. The intermediate or lower part of the steering column 25 may be connected by further universal joints, to the actual steering mechanism.

The pivot 13 of the support arm 11 is at the rear side of the boss 14, located away from the vehicle driver, while the pivot 20 of the gas spring 18 is at the front side of the boss 14, closest to the driver.

The gas spring 18 is of a conventional design and the length of the gas spring may be selected, and may be locked by means of a known locking arrangement, so that the length is then fixed. The locking arrangement is releasable in response to a signal from an accident sensor 70.

In the position of the described tilting mechanism as shown in FIG. 1, the steering wheel 22 is an almost horizontal position. The steering wheel may be used in this position in a large vehicle such as a lorry, truck or bus. The steering wheel may, however, be adjusted to have a more inclined position, at the wish of the driver of the vehicle, to enhance the comfort of the driver of the vehicle. FIG. 2 shows a first tilted position in which the length of the gas spring 18 has been reduced, and the gas spring has again been locked in position. The steering wheel 22 is thus partially tilted towards the driver.

FIG. 3 shows the gas spring 18 fully compressed, and the steering wheel is in a more tilted condition.

It is thus to be understood that the steering wheel is mounted so that the steering wheel can tilt, selectively, about an axis defined by the pivot point 13 which is at the upper end of the support arm 11, towards the rear of the steering wheel unit.

Here it is to be understood that the lock provided on the gas spring 18 is adapted so that the lock may be released when an accident situation is sensed by an appropriate sensor. Also, the drive element 15 as constituted by the pyrotechnic unit may be actuated by a signal from the sensor. Additionally, if a retractable pin is used instead of the frangible shear pin 17a, the retractable pin may be retracted in response to a signal from the sensor and finally the locked energy-absorber 7 may be released in response to a signal from the sensor.

The sensor generates appropriate signals at appropriate times so that the mechanism actuates in the desired manner during an accident situation.

Turning now to FIG. 4, when an accident situation is sensed, the retractable pin 17a is retracted (if provided), and also the pyrotechnic unit 15 is actuated, so that the overall length of the pyrotechnic unit increases. The support arm 11 is thus driven to pivot in a generally upward direction about the lower pivot point 12. If a frangible pin 17a is provided, the pin will break on actuation of the pyrotechnic unit 15. As the support arm 11 moves, the pivot axis 13 moves acutely and upwardly. The pivot axis 13 thus effects movement with a substantial upward component. As the pivot axis 13 moves acutely and upwardly, the part of the boss 14 connected to the pivot 13 moves acutely and upwardly bringing the pivot 20 at the upper-most end of the lockable gas spring 18 into contact with the upper-most edge of the support plate 9. The lock on the gas spring has been released, and continued extension of the pyrotechnic unit 15, as shown in FIG. 5, causes the support arm 11 to move further in an upward direction, thus causing the pivot pin 20 to move across the upper-most edge of the support plate 9, whilst the length of the gas spring 18 increases.

The tilting mechanism reaches a final condition, as shown in FIG. 5, in which the pivot pin 20 may engage a stop 26 constituted by a recess in the upper-most edge of the support plate 9.

The steering wheel is now in a fully tilted position directed towards the driver of the vehicle. It is to be noted that, as the steering wheel has moved from the position illustrated in FIG. 3 to the position illustrated in FIG. 5, whilst the steering wheel has been tilted, the lower-most part of the rim of the steering wheel has not moved downwardly substantially relative to the horizontal reference line 4 and, indeed, as shown in FIG. 5, in the final position of the mechanism the lowermost part of the rim of the steering wheel is actually at a higher position relative to the reference line 4 than in the condition of the tilting mechanism shown in FIG. 3.

Thus, during the automatic tilting of the steering wheel which is effected when an accident condition is sensed, the rim of the steering wheel is actually moved upwardly during the tilting and is not moved downwardly.

FIG. 6 shows the condition of the mechanism shortly after the steering wheel has reached the fully tilted position as shown in FIG. 5, and it can be seen that an air-bag 27 is now fully inflated. The air-bag is directed towards the driver of the vehicle.

Should the driver of the vehicle impact with the air-bag 27 with a sufficient force, the support plate 9 will move, relative to the mounting plate 2 in the direction indicated by the arrow 10, and during this movement the energy-absorber 7 will absorb energy. The energy-absorber 7 may be of any conventional design.

FIG. 8 illustrates a modified embodiment of the invention. This embodiment of the invention is, in many respects, substantially identical to the embodiment of FIGS. 1 to 7, save that the pyrotechnic drive element 15 has been omitted. Thus like references are used to identify like parts, and these parts will not be re-described in great detail. It is to be understood, however, that, as in the embodiment of FIGS. 1 to 7, the lockable gas spring 18 may have its length selected so that the steering wheel 22 has an initial desired degree of tilt for the comfort of the driver.

In the event that an accident should arise, the lockable gas spring 18 will become unlocked and also the lockable energy-absorber 7 will become unlocked. As a consequence of the forward force applied to the steering wheel 22 by the driver of the vehicle, the shear pin 17a will break, or if a retractable pin 17a is provided the pin will be retracted in response to an accident situation being sensed. In either event, the elongate support arm 11 is released to pivot about the lower pivot axis 12. The support arm 11 will, due to the forces applied to the steering wheel 22, pivot in a manner directly equivalent to that described above so that the pivot axis 13 moves with an upward actuate movement from the position shown in FIG. 8 to the position shown in FIG. 9, thus increasing the angle of tilt of the steering wheel 22 and bringing the pivot 20 into engagement with the upper-most edge of the support plate 9, as in the embodiment described above.

Should the driver of the vehicle apply a substantial force to the inflated air-bag 27, the support plate 9 will move in the direction of the arrow 10, as shown in FIG. 10, thus compressing the energy-absorber 7 which will absorb energy.

Turning finally to FIGS. 11 and 12, a further embodiment of the invention is illustrated. In this embodiment of the invention a motor vehicle 30 is provided having a chassis, of which part 31 is illustrated. Connected to the chassis, by means of a hinge 32, is a mounting plate 33. An upper-most part of the mounting plate is provided with a pivot 34 connected to one end of an energy-absorber 35, the other end of which is connected, by means of a connection 36 to part of the chassis. As will become clear from the following description the mounting plate may effect a hinging movement about the hinge 32 with energy being absorbed by the energy-absorber 35.

Connected to the mounting plate 33, so as to effect a sliding movement relative to the mounting plate in the direction indicated by the arrow 37 is a support plate 38.

The support plate 38 is provided with a projecting pin 39 which is connected to part of a pyrotechnic drive unit 40, another part of the pyrotechnic drive unit 40 being connected to a pin 41 carried on a lug 42 carried by the mounting plate 33. The drive unit 40 may thus, when actuated, drive the support plate 38 with a sliding movement relative to the mounting plate 33 in the direction indicated by the arrow 37.

A pivot pin 43 provided on the support plate 38 is connected to one end of a lockable gas spring 44. The other end of the gas spring 44 is connected to a pivot 45 on a boss 46. The lockable gas spring 44 is a modified lockable gas spring in that, when the gas spring is "unlocked" the length of the gas spring automatically reduces to a minimum length. Thus the gas spring may incorporate a pyrotechnic charge appropriately positioned so that, in response to a signal, the gas spring is firstly "unlocked" and secondly the pyrotechnic charge moves the gas spring to a condition in which it has a minimum length. The gas spring 44 is an element of selectively adjustable length, as was the gas spring 18 of the embodiments described above.

The boss 46 is pivotally connected (at 47) to the support plate 38, and supports the upper part 48 a steering column and mounted on the upper part of the steering column is a steering wheel 49. Contained within the steering wheel 49 is a housing 50 which itself contains an air-bag.

The upper part of the steering column 48 is connected by means of a universal joint 51 to a lower or intermediate part 52 of the steering column which, itself, may be connected by one or more further universal joints to the steering mechanism.

It is to be appreciated that the degree of tilt of the steering wheel 49 may be adjusted by selecting an appropriate length for the lockable gas spring 44. As the length of the lockable gas spring 44 increases or decreases, the steering wheel will tilt about the axis of the pivotal connection 47 between the boss 46 and the support plate 9.

It is to be appreciated that in the event that an accident is sensed, the lock provided on the lockable gas spring 44 will be released, the pyrotechnic drive unit 40 will be actuated and the lockable energy-absorber 35 will be released.

As a consequence of actuation of the pyrotechnic drive unit 40, the support plate 38 will be driven, with a sliding motion relative to the mounting plate 33, in the direction indicated by the arrow 37. The pivot 47 will thus be moved upwardly and laterally. Thus, again, the pivot axis effects a movement with a substantial upward component.

The gas spring 44 will move to the contracted state in response to a signal from the sensor, and thus, as can be seen in FIG. 12, the boss 46 will become tilted, and the tilt of the steering wheel 49 will thus be increased.

The air-bag 53, when inflated (as shown in FIG. 12) will be located between the steering wheel 49 and the occupant of the vehicle. If the occupant of the vehicle provides a very substantial force to the steering wheel through the air-bag, the mounting plate 33 will move with a hinging action about the hinge 32 compressing the energy-absorber 35. The movement of the mounting plate is indicated by the arrow 54. As the mounting plate moves energy will be absorbed.

It is thus to be understood that in the described embodiments of the invention, in an accident situation, a pivot axis about which the steering wheel may pivot is caused to move, that movement having at least a substantial upward component. As the pivot axis moves upwardly so the angle of inclination of the steering wheel is increased, thus enabling the air-bag carried by the steering wheel to be positioned between the steering wheel and the driver of the vehicle. The rim of the steering wheel at its lowest point, as a consequence of the movement, does not move downwardly substantially, thus minimizing any risk of trapping the legs of the seat occupant. Should the seat occupant impart a very substantial load on the air-bag, a mounting plate will move, relative to the chassis of the vehicle, and energy will be absorbed by an energy-absorber.

In the present Specification "comprises" means "includes or consists of" and "comprising" means "including or consisting of".

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A tilting arrangement for a vehicle steering wheel unit, the tilting arrangement comprising:
   a mount to mount the tilting arrangement on the vehicle, and
   a support element, the steering wheel unit being pivotally connected to the support element to effect a tilting pivotal movement, about a pivot axis, the support element being movable relative to the mount so as to move the pivot axis with a movement which has a substantial upward component;
   wherein the pivotal connection between the support element and the steering wheel unit is towards a rear of the steering wheel unit, there being a further member pivotally connected to the steering wheel unit towards a front of the steering wheel unit so that, as the pivotal connection between the support element and the steering wheel unit directs said movement to include a substantial upward component, the steering wheel tilts forwardly; and
   wherein the support element is a support plate and further wherein when the pivotal connection between the steering wheel unit and the support plate has directed said upward movement and the steering wheel has tilted, a rim of the steering wheel, at its lowest point, is not substantially lower than the rim of the steering wheel, at its lowest point before said movement commenced.

2. A tilting arrangement according to claim 1, wherein the said further element is an element of selectively adjustable length, to enable the degree of tilt of the steering wheel to be selected by a vehicle driver.

3. A tilting arrangement according to claim 2 wherein the element of selectively adjustable length is a lockable gas spring.

4. A tilting arrangement according to claim 3 wherein the lockable gas spring is adapted to adopt a condition of minimal length upon receipt of a signal from a sensor.

5. A tilting arrangement according to claim 1 wherein the support element comprises a pivotally mounted support arm, the support arm being pivotally mounted to a support plate at its lower end and being pivotally connected to the steering wheel unit at its upper end, movement of the arm causing the axis of the pivotal connection between the arm and the steering wheel unit to follow an arcuate path.

6. A tilting arrangement according to claim 5 further comprising a retaining member to retain the arm in an initial position, and to release the arm in an accident situation.

7. A tilting arrangement according to claim 6 wherein the said retaining member is a frangible pin.

8. A tilting arrangement according to claim 6 wherein the retaining member comprises a retractable pin, retractable in response to a signal from a sensor.

9. A tilting arrangement according to claim 5 wherein a drive unit is provided to drive said support arm to effect said pivotal movement.

10. A tilting arrangement according to claim 9 wherein the drive unit is a pyrotechnic unit.

11. A tilting arrangement according to claim 5 wherein the support plate is mounted to effect a sliding movement relative to the mount, an energy-absorber being provided to absorb energy as the support plate effects the sliding movement relative to the mount.

12. A tilting arrangement according to claim 11 wherein the energy-absorbing unit is a lockable energy-absorbing unit, the lockable energy-absorbing unit being configured to be unlocked in response to a signal from a sensor.

13. A tilting arrangement according to claim 1 wherein the support element is a support plate, the steering wheel unit being pivotally connected to the plate, the said further member being pivotally connected to the support plate and being pivotally connected to the steering wheel unit.

14. A tilting arrangement according to claim 13 wherein the support plate is slidably mounted relative to the mount, and an energy-absorber is provided connected to the support plate and to the mount to absorb energy as the support plate moves relative to the mount.

15. A tilting arrangement according to claim 13 wherein the mount is provided with a hinge to engage part of a chassis of a motor vehicle and is provided with an energy-absorber to absorb energy if the mount executes a hinging movement about the hinge.

16. A tilting arrangement according to claim 15 wherein the energy-absorber is a lockable energy-absorber a lock of the lockable energy-absorber being releasable in response to a signal from a sensor.

17. A tilting arrangement for a vehicle steering wheel unit, the tilting arrangement comprising:
   a mount to mount the tilting arrangement on the vehicle, and
   a support element, the steering wheel unit being pivotally connected to the support element to effect a tilting pivotal movement, about a pivot axis, the support element being movable relative to the mount so as to move the pivot axis with a movement which has a substantial upward component;
   wherein the pivotal connection between the support element and the steering wheel unit is towards a rear of the steering wheel unit, there being a further member pivotally connected to the steering wheel unit towards a front of the steering wheel unit so that, as the pivotal connection between the support element and the steering wheel unit directs said movement to include a substantial upward component, the steering wheel tilts forwardly;
   wherein the support element is a support plate and further wherein when the pivotal connection between the steering wheel unit and the support plate has directed said upward movement and the steering wheel has tilted, a rim of the steering wheel, at its lowest point, is not substantially lower than the rim of the steering wheel, at its lowest point before said movement commenced; and wherein the support element comprises a pivotally mounted support arm, the support arm being pivotally mounted to a support plate at its lower end and being pivotally connected to the steering wheel unit at its upper end, movement of the arm causing the axis of the pivotal connection between the arm and the steering wheel unit to follow an arcuate path.

* * * * *